2 Sheets--Sheet 1.

W. W. CLEMENTS.
Turpentine-Pan.

No. 161,754.  Patented April 6, 1875.

WITNESSES
Villette Anderson.
E. H. Bates

INVENTOR
William W. Clement,
Chipman Hosmer & Co.
ATTORNEYS

THE GRAPHIC CO.PHOTO-LITH.39 & 41 PARK PLACE, N.Y.

2 Sheets--Sheet 2.

W. W. CLEMENTS.
Turpentine-Pan.

No. 161,754. Patented April 6, 1875.

WITNESSES
Villette Anderson.
A. L. Fraser

INVENTOR
William W. Clements
Chipman Hosmer & Co
ATTORNEYS

THE GRAPHIC CO.PHOTO-LITH.39 & 41 PARK PLACE,N.Y.

UNITED STATES PATENT OFFICE.

WILLIAM W. CLEMENTS, OF CAMILLA, GEORGIA.

IMPROVEMENT IN TURPENTINE-PANS.

Specification forming part of Letters Patent No. 161,754, dated April 6, 1875; application filed February 13, 1875.

*To all whom it may concern:*

Be it known that I, WILLIAM W. CLEMENTS, of Camilla, in the county of Mitchell and State of Georgia, have invented a new and valuable Improvement in Turpentine-Pans; and I do hereby declare that the following is a full, clear, and exact description of the construction and operation of the same, reference being had to the annexed drawings, making a part of this specification, and to the letters and figures of reference marked thereon.

Figure 1:
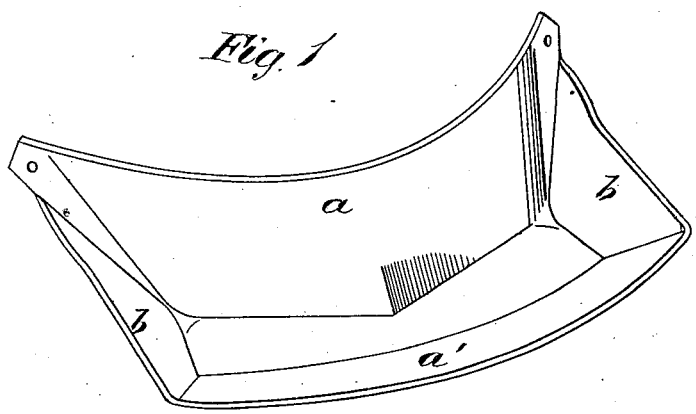
Figure 2:
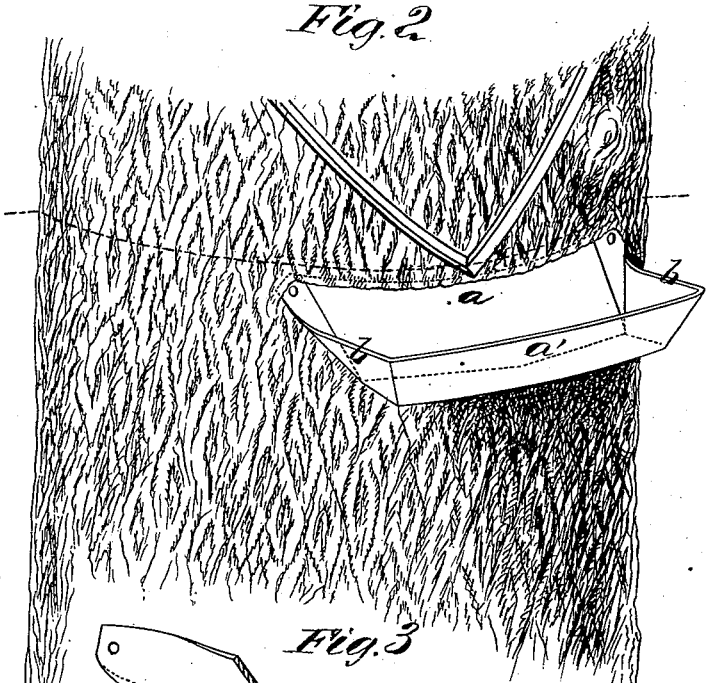
Figure 3:
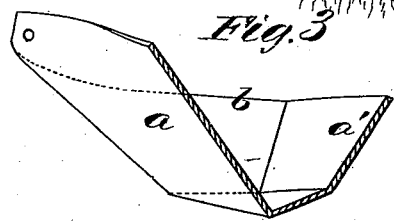
Figure 4:
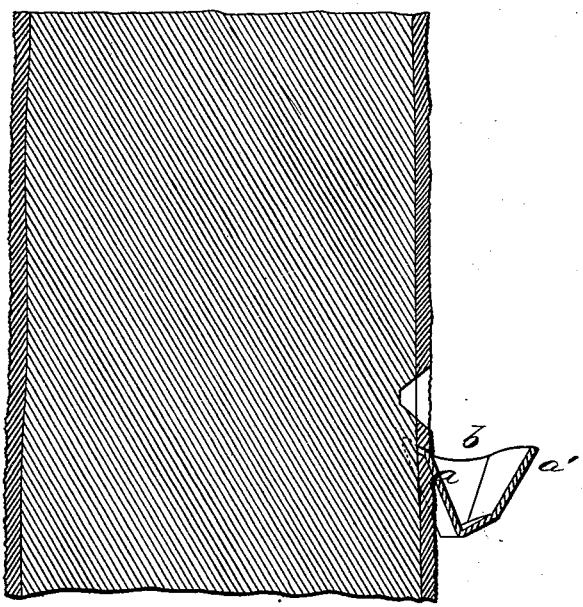
Figure 5:
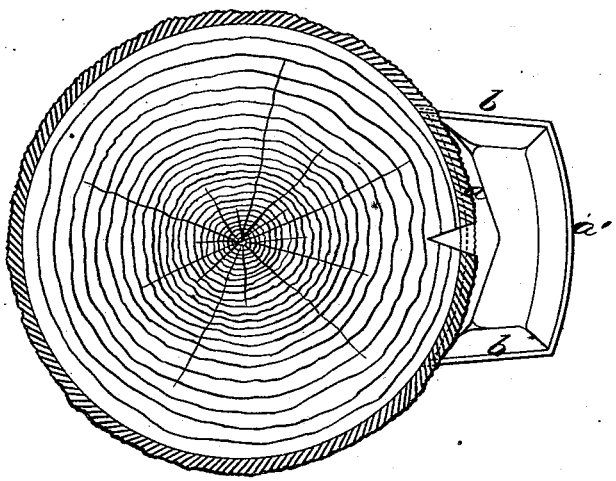

Figure 1 of the drawing is a representation of a perspective view of my turpentine-pan. Figure 2 is a view of the same as applied to a tree, and Fig. 3 is a sectional view.

The process of collecting the turpentine has usually been to cut a pocket in the tree a few inches from the ground, and remove the bark for several inches above the pocket.

For many reasons this method of collecting the turpentine is very objectionable, among which are that the trunks of the trees are weakened, and the trees are often killed or so injured as to afford a poor supply of turpentine.

The nature of my invention consists in a metallic cup or box, which is struck or pressed out of sheet metal, of such form as will closely fit the tree, and having its ends perforated to receive nails, by which it is fastened to the tree, as will be understood from the following description:

In the annexed drawings I have represented my improved cup, which is formed with inclined sides *a a'*, and inclined ends *b b*, so that in a cross-section the shape of the pan bears some resemblance to the letter V.

The sides of this pan are curved, and the upper edge of the side *a* conforms to the shape of the tree, and is more or less flexible, so that it can be made to fit closely to trees of different diameters.

The cup is secured to a tree by means of nails driven through its corners, as shown in Fig. 2, after which a small trench is made into the tree with a turpentine "hack" just above the cup.

This cup can be readily detached from the tree and applied at different points thereon, as the season for collecting advances, thus enabling me to collect the finest quality of turpentine at all times.

In practice I shall manufacture the cups of thin sheet metal, by stamping the blanks between dies of suitable shape. I thus make a cheap cup, which, being of one piece and without seams, will not be injured by exposure to the weather.

What I claim as new, and desire to secure by Letters Patent, is—

As a new article of manufacture, the laterally bowed metallic cup or box, struck or pressed out of sheet metal in the concavo-convex form, adapted to fit the convexity of the trunk of a tree, and having its upper portion perforated, substantially as and for the purpose specified.

In testimony that I claim the above I have hereunto subscribed my name in the presence of two witnesses.

WILLIAM WOODSON CLEMENTS.

Witnesses:
JAS. L. STEWART,
E. H. SHACKELFORD.